United States Patent [19]
Brenner et al.

[11] 3,842,970

[45] Oct. 22, 1974

[54] SLAT CONVEYOR

[76] Inventors: Lawrence A. Brenner, 1423 Stallion Ln., Westchester, Pa. 19380;
Charles H. Scholl, 233 W. Main St., Adamstown, Pa. 19501

[22] Filed: May 4, 1972

[21] Appl. No.: 250,160

[52] U.S. Cl. ................................. 198/195, 308/208
[51] Int. Cl. ..................... B65g 15/30, H03k 19/08
[58] Field of Search ............ 198/195, 127; 308/208, 308/210

[56] References Cited
UNITED STATES PATENTS

| | | | |
|---|---|---|---|
| 858,361 | 7/1907 | Aldridge | 308/210 |
| 2,265,554 | 12/1941 | Thomas | 308/208 |
| 2,897,022 | 7/1959 | Marola | 308/208 |
| 3,002,604 | 10/1961 | Brems | 198/195 |

*Primary Examiner*—Richard E. Aegerter
*Attorney, Agent, or Firm*—Walter G. Sutcliff

[57] ABSTRACT

A slat conveyor combination is detailed having an improved support wheel assembly. The support wheel assembly comprises a generally cylindrical non-rotatable inner race member, and overfitting rotatable outer wheel portions which fit on the end of a main support shaft. A bearing raceway is defined between the inner race and outer wheel portion, with bearing means confined within the raceway. The cylindrical inner race extends inwardly along the support shaft beyond the inward extent of the outer wheel portion to abut the article supporting structure and act as a thrust face preventing contact and binding of the wheel portion.

8 Claims, 3 Drawing Figures

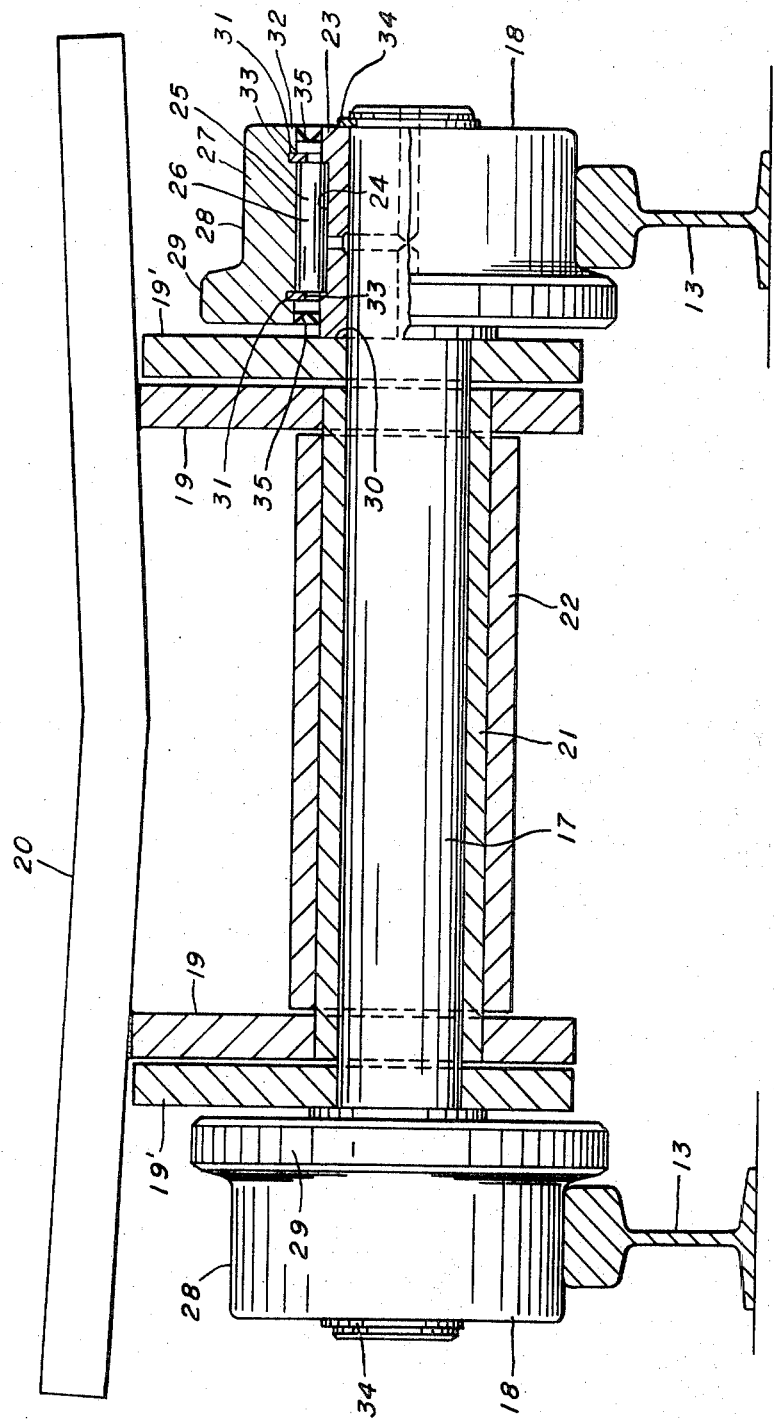

SLAT CONVEYOR

BACKGROUND OF THE INVENTION

The field of the present invention is material handling conveyors, and more specifically what is termed a slat conveyor, which comprises a plurality of support plates or trays carried by wheeled assemblies which ride a guide track and which have an integral drive. The slat conveyor is designed to carry bulky, heavy loads and the conveyor which is specifically described herein is designed for carrying and transferring large rolls of paper.

The wheel assemblies for such conveyors are subjected to substantial loading forces. The conveyors are also typically designed to run with the carry at floor level and can be ridden over with a fork lift truck or the like, which again subjects the support wheels to heavy loadings.

These type of conveyors can comprise simple straight horizontal travel carry conveyors, or they can be built with a turning radius. The support wheels can be relatively closely spaced, i.e., spaced about 18 inches apart along a support shaft, for the standard slat conveyor, or be relatively widely spaced for the powered ramp-type conveyor which is designed to carry rolls with their central axis perpendicular to the travel of the conveyor.

The prior art wheel assemblies typically comprised an inner race bushing or sleeve fitted over the end of the support shaft and secured with a pin. A bearing means was then fitted between the inner race and the overfitting outer wheel. The wheel which rotates upon movement of the conveyor is very close to the linking side bars which support the conveyor plates or trays, and these side bars can be subjected to side loading to force it against the wheel, resulting in wear of both pieces or even stoppage of the wheel. A retaining collar was fitted over the end of the support shaft and inner race to abut against the outer wheel to prevent it from movement off the end of the shaft. The collar was pinned to the support shaft. Since the collar did not rotate, this was another source of wear against the rotating outer wheel. The conveyor on which these support wheel assemblies are used, as mentioned, typically ride a guide track at floor level in a factory, and foreign matter could easily foul the wheel bearing.

SUMMARY OF THE INVENTION

An improved slat-type conveyor assembly is provided having an improved support wheel structure. The slat-type conveyor assembly comprises a plurality of wheeled segments including support wheels mounted on opposed ends of a non-rotatable support shaft. Spaced parallel linking means are mounted on opposed ends of the support shaft inwardly of the support wheels. The linking means extend between support shafts of succeeding wheeled segments to connect them together, and article support means are mounted on the linking means. The wheeled segments are adapted to be coupled to drive means for advancing the conveyor assembly.

The improved support wheels comprise a generally cylindrical non-rotatable inner race fitted on the end of the support shaft. The inner race extends inwardly along the support shaft in abutting relationship with the linking means. The inner race has a grooved exterior surface portion serving as a raceway, and bearing means are fitted within the raceway. An annular rotatable outer wheel portion overfits the inner race and is spaced therefrom by the bearing means, while the outer surface of the outer wheel portion rides upon a conveyor support surface. In operating the slat conveyor only the outer wheel portion rotates, with the other portions of the wheeled segments being non-rotatable and linearly advancing along the support track surface.

BRIEF DESCRIPTION OF THE DRAWINGS

FIG. 3 is a partial sectional view taken through the wheel assembly shown in FIG. 2, shown disposed upon guide tracks.

DESCRIPTION OF THE PREFERRED EMBODIMENTS

Figure 1:
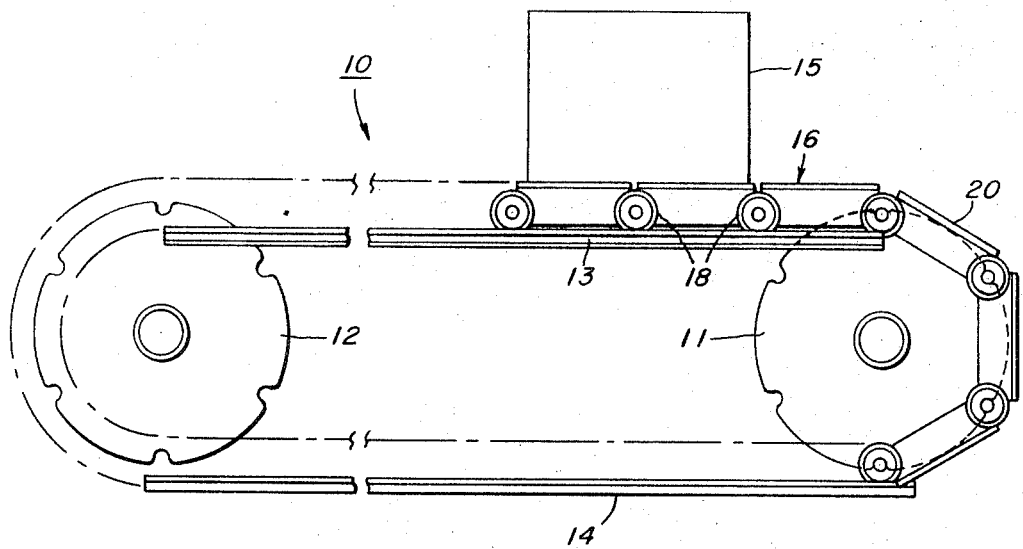
FIG. 1 is a side elevational view of an embodiment of a simple slat conveyor assembly of the invention.

The invention can be best understood by reference to the exemplary embodiments shown in the drawings. In FIG. 1, the material handling slat conveyor assembly 10 operates as an endless chain, with a driving head sprocket 11 driving the conveyor as will be explained in detail hereafter, and a tail sprocket 12. Any variety of drive sprocket and take-up units can be employed. The slat conveyor assembly 10 rides on a guide track 13 typically at ground level, and return track 14 which is typically disposed below ground level. The article conveyed is described herein as a paper roll 15 with the central axis of the roll aligned with the direction of travel of the conveyor.

Figure 2:
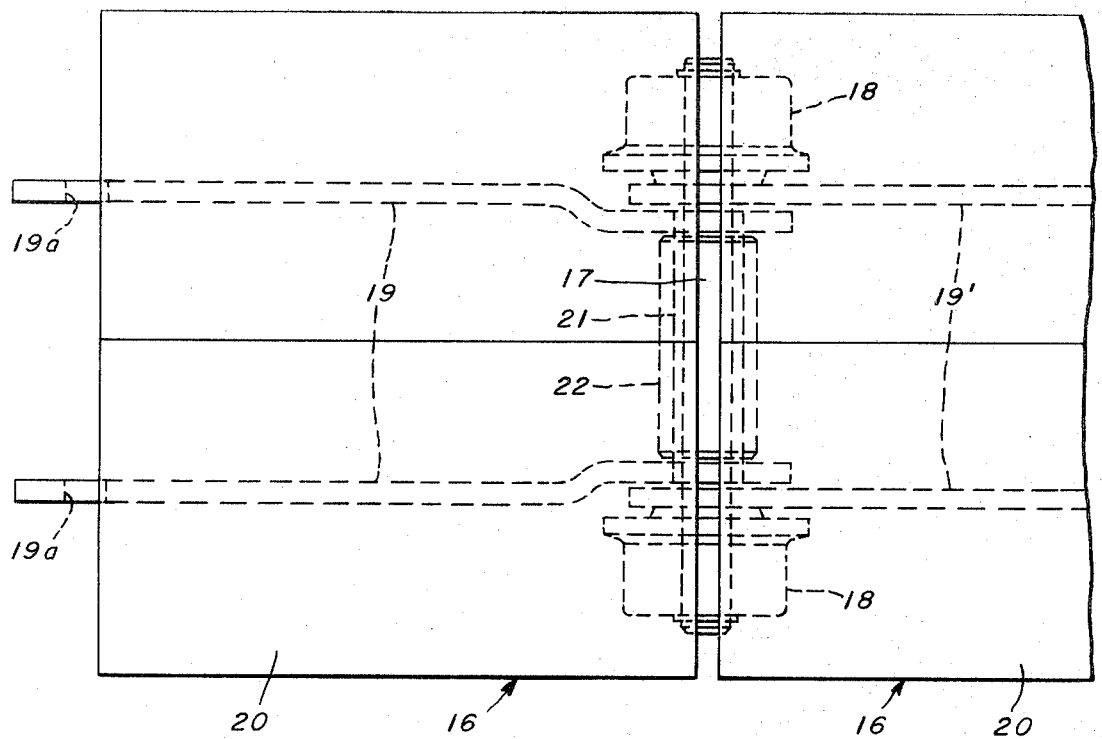
FIG. 2 is an enlarged plan view of a wheel assembly for the slat conveyor of the present invention.

The slat conveyor assembly 10 is more clearly seen in FIGS. 2 and 3 as a plurality of identical slat conveyor segments 16 which are linked together forming an endless chain. A segment 16 here includes a support shaft 17, wheel assemblies 18 at each end of the shaft 17, a pair of supporting side bars 19 mounted on the shaft 17, and the carrying plate or tray 20 mounted on the side bars 19 which also serve as the linking means between successive shafts 17. The support shaft 17 is formed of high strength alloy steel with high strength wheel assemblies 18 at each end of the support shaft 17. The pair of side bars 19 extend from the support shaft 17 to the adjacent segment 16 support shaft, with the side bars 19 supporting the article support pans or plates 20, as well as linking together the segments 16 as clearly seen in FIG. 2. The side bars 19' from the adjacent segment are mounted on and connected to shaft 17 as the link element. Apertures 19a are provided through each end of the linking side bars 19, 19' to permit the side bars to be mounted on the support shafts 17 of successive segments 16.

A cylindrical sleeve 21 fits over the central portion of support shaft 17, and roller 22 is fitted over the sleeve 21. It is roller 22 which is engaged by the drive sprocket 11 to advance the conveyor. Mating engagement means, not shown, are provided on the roller 22 and the drive sprocket 11. Sleeve 21 protects the support shaft 17 from wear.

The wheel assemblies 18 comprise a generally cylindrical inner race member 23 (FIG. 3) which is machined to fit the support shaft 17. The exterior surface 24 of the generally cylindrical inner race member 23 is machined to define a bearing raceway 25. The support shaft 17 and attached inner race member 23 do not rotate as the conveyor advances. Bearing means 26, here a plurality of cylindrical roller bearings fit within raceway 25. The annular outer wheel portion 27 fits over the inner race member 22 and is spaced therefrom by the bearing means 26. The outer wheel portion 27 is the element which rotates upon advance of the conveyor. The outer wheel 27 includes a guide track bearing portion 28 and a hub portion 29 which serves to keep the wheels on the tracks 13.

It should be particularly noted that inner race member 23 extends inwardly along the support shaft 17 beyond the inward extent of the outer wheel portion 27 for at least about 1/16 of an inch, to thereby abut the linking side bar 19' of the adjacent segment 16, with inner race member end surface 30 acting as a thrust face to insure that any misaligned loading does not bring the side bar 19' into contact with the rotatable outer wheel 27. The outer wheel is thus assured free rotatability, preventing wear or binding thereof.

A pair of grooves 31 are provided on the inner surface 32 of the outer wheel 27 at the end of the bearing means 26, which grooves 31 accept and retain retaining rings 33. The retaining rings 33 are spring members which further serve to restrain the bearing means 26 within the raceway 25. A retaining ring 34 is fitted over the end of support shaft 17 and abuts against the inner race member 23. Retaining ring 34 is readily removable to permit the quick removal of the entire wheel assembly for repair.

A pair of bearing seals 35 are provided spaced from each end of the bearing means 26. The bearing seals 35 fit within the space between the inner race member 23 and the outer wheel 27 to protect the bearing means 26 from dirt or other debris which could foul the bearing. The seal can be typically the very effective bearing seals described in detail in U.S. Pat. No. 3,366,428.

The entire wheel assembly just described is a significantly simplified and superior structure which provides a more rugged, durable slat conveyor assembly. Contact between the rotatable outer wheel portion and static portions has been eliminated.

It should be understood the improved support wheel structure of the present invention can be utilized with more complicated slat conveyor assemblies than the embodiment described by way of example. The same support wheel structure can be used with a powered ramp-type conveyor which conveys paper rolls with their central axis perpendicular to the travel to the conveyor. For powered ramp-type conveyors the support shaft is extended providing a greater wheel spread. The invention can also be utilized with a universal slat conveyor which has a turning radius.

The conveyor assemblies described employ high strength alloy steel for the components which are load bearing, and particularly the support shaft and the outer wheel portions.

The conveyor assembly of the present invention provides for greater ease of assembly and disassembly, and for greatly increased life, because of the elimination of contact between rotating and non-rotating portions of the conveyor.

We claim:

1. In combination with a slat conveyor assembly comprising a plurality of linked wheeled segments including support wheels mounted on opposed ends of a non-rotatable support shaft, parallel pairs of linking means extending between the support shafts of succeeding wheeled assemblies, the linking means of each pair spaced apart and mounted on opposed ends of the support shaft inwardly from the support wheels, and article support means mounted on the linking means, the wheeled assemblies being adapted to be coupled to drive means for advancing the conveyor assembly, the improvement comprising an improved support wheel having a non-rotatable generally cylindrical inner race fitted on the end of the support shaft, said inner race extending inwardly along the support shaft in abutting relationship with the linking means, said inner race having a grooved exterior surface portion, serving as a raceway, bearing means fitted within the raceway, and an annular rotatable outer wheel portion overfitting the non-rotatable inner race and spaced therefrom by the bearing means, with the outer surface of the rotatable outer wheel portion riding upon a conveyor support surface.

2. The combination specified in claim 1, wherein a retaining ring is provided about the end of the support shaft abutting the inner race of the support wheel assembly.

3. The combination specified in claim 2, wherein the retaining ring abuts the outwardly extending end of the inner race proximate the terminal end of the support shaft.

4. The combination specified in claim 3, wherein the retaining ring is resilient and snaps off and on the support shaft abutting the inner race.

5. The combination specified in claim 1, wherein the bearing means comprises a plurality of cylindrical roller bearings fitting within the raceway defined between the inner race and the outer wheel portion.

6. The combination specified in claim 1, wherein retaining rings are fitted at each end of the raceway to retain the bearing means therein.

7. The combination specified in claim 1, wherein bearing seals are also disposed between the inner race and outer wheel portion proximate each end of the bearing means.

8. In combination with a slat conveyor assembly comprising a plurality of linked wheeled segments including support wheels mounted on opposed ends of a non-rotatable support shaft, parallel pairs of linking means extending between the support shafts of succeeding wheeled assemblies, the linking means of each pair spaced apart and mounted on opposed ends of the support shaft inwardly from the support wheels, and article support means mounted on the linking means, the wheeled assemblies being adapted to be coupled to drive means for advancing the conveyor assembly, the improvement comprising an improved support wheel having a non-rotatable generally cylindrical inner race fitted on the end of the support shaft, said inner race extending inwardly along the support shaft in abutting relationship with the linking means, said inner race having a grooved exterior surface portion, serving as a raceway, a plurality of cylindrical roller bearings fitted within the raceway, an annular rotatable outer wheel portion overfitting the non-rotatable inner race and spaced therefrom by the cylindrical roller bearings, with the outer surface of the rotatable outer wheel portion riding upon a conveyor support surface, retaining rings and bearing seals are fitted at each end of the raceway, and a retaining ring is resiliently fitted on the support shaft abutting the outwardly extending end of the inner race proximate the terminal end of the support shaft.

* * * * *

UNITED STATES PATENT OFFICE
CERTIFICATE OF CORRECTION

Patent No. 3,842,970          Dated October 22, 1974

Inventor(s) Lawrence A. Brenner and Charles H. Scholl

It is certified that error appears in the above-identified patent and that said Letters Patent are hereby corrected as shown below:

On the face of the patent, insert the following:

--Assignee: Beloit Corporation
            Beloit, Wisconsin--

Signed and sealed this 4th day of February 1975.

(SEAL)
Attest:

McCOY M. GIBSON JR.　　　　　　　　C. MARSHALL DANN
Attesting Officer　　　　　　　　　Commissioner of Patents